(12) United States Patent
Brandwine

(10) Patent No.: US 9,398,121 B1
(45) Date of Patent: Jul. 19, 2016

(54) SELECTING AMONG VIRTUAL NETWORKING PROTOCOLS

(71) Applicant: Amazon Technologies, Inc., Reno, NV (US)

(72) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 268 days.

(21) Appl. No.: 13/925,573

(22) Filed: Jun. 24, 2013

(51) Int. Cl.
*G06F 15/16* (2006.01)
*H04L 29/06* (2006.01)

(52) U.S. Cl.
CPC ...................................... *H04L 69/24* (2013.01)

(58) Field of Classification Search
CPC ....... H04L 69/24; H04L 9/0827; H04L 63/18; H04L 63/62
USPC ................... 709/230, 203, 231; 370/464, 465
See application file for complete search history.

(56) References Cited

U.S. PATENT DOCUMENTS

| | | | | |
|---|---|---|---|---|
| 6,205,148 B1 * | 3/2001 | Takahashi | ........... | H04L 12/2856 370/395.54 |
| 7,313,613 B1 * | 12/2007 | Brooking et al. | ............. | 709/223 |
| 7,558,847 B2 * | 7/2009 | Strassner | ...................... | 709/223 |
| 7,676,587 B2 * | 3/2010 | Faibish et al. | ................. | 709/230 |
| 7,882,254 B2 * | 2/2011 | Choi et al. | ..................... | 709/230 |
| 8,234,333 B2 * | 7/2012 | Morard | ......................... | 709/203 |
| 8,626,912 B1 * | 1/2014 | Rothstein | ................ | H04L 43/18 370/235 |
| 8,699,499 B2 * | 4/2014 | Mulligan | ............ | G06F 9/45533 370/395.51 |
| 2002/0169883 A1 * | 11/2002 | Bright et al. | ................... | 709/230 |
| 2006/0075114 A1 * | 4/2006 | Panasyuk et al. | ............. | 709/227 |
| 2006/0265508 A1 * | 11/2006 | Angel et al. | ................... | 709/230 |
| 2007/0171921 A1 * | 7/2007 | Wookey | ................ | G06F 3/1415 370/401 |
| 2008/0043755 A1 * | 2/2008 | Nordmark et al. | ............ | 370/397 |
| 2010/0281176 A1 * | 11/2010 | Jahnke et al. | ................. | 709/230 |
| 2012/0215932 A1 * | 8/2012 | Shemesh | ............... | H04L 9/0869 709/230 |
| 2013/0054761 A1 * | 2/2013 | Kempf | .................. | H04L 47/781 709/220 |
| 2013/0067466 A1 * | 3/2013 | Combs et al. | ..................... | 718/1 |
| 2013/0238778 A1 * | 9/2013 | Reitan | ..................... | H04L 41/00 709/223 |
| 2013/0246654 A1 * | 9/2013 | Cicic | ....................... | H04L 45/00 709/238 |
| 2016/0044107 A1 * | 2/2016 | Acker | ................. | H04L 67/1097 709/203 |
| 2016/0087835 A1 * | 3/2016 | Mulligan | ............ | H04L 41/0803 709/220 |

* cited by examiner

*Primary Examiner* — Thu Ha Nguyen
(74) *Attorney, Agent, or Firm* — Baker & Hostetler LLP

(57) ABSTRACT

Techniques are disclosed for determining a virtual networking framework for computing nodes to use where they are part of a plurality of computing nodes that have heterogeneous virtual networking framework capabilities. Each node may report its capabilities to a mapping server, which serves as a centrally-managed selector of policy capabilities for the two computing nodes to use in communications with each other. The mapping server selects virtual networking framework capabilities for the two computing nodes to use in communicating with each other, instructs the nodes of these selected capabilities, and the two nodes then communicate according to these selected capabilities.

29 Claims, 9 Drawing Sheets

SELECTING AMONG VIRTUAL NETWORKING PROTOCOLS

BACKGROUND

Compute service providers, sometimes referred to as cloud service providers, provide services to various entities, such as corporations, universities, government agencies and other types of customers, to compute resources hosted in one or more datacenters. There are a number of reasons for entities to run their compute resources or at least some of their compute resources on a compute service. For example, running their compute resources in datacenters operated by the compute service may provide the entities with flexibility in resource allocation as well as providing scalability, improved resource allocation, reduced operating costs and the like.

Often, a cloud service provider virtualizes some or all of the necessary compute resources to generate virtual private clouds of topologies specific to its customers. This virtualization allows the cloud service provider to dynamically scale hardware and software of the compute resources to meet needs and requirements of its customers. The virtual private cloud of one customer is typically isolated from a virtual private cloud of another customer of the same cloud service provider, even when the two virtual private clouds are hosted on compute resources operating in the same datacenter. The isolation protects each customer from security breaches, among other things, and renders each virtual private cloud a private network inaccessible by the other customers of the same cloud service provider.

These virtual private clouds may be built on a virtual networking framework (sometimes referred to as a virtual networking protocol) than enables customers to provision their own virtual private cloud, or virtual datacenter. Different virtual networking frameworks may support different features for virtual networks built on the respective virtual networking frameworks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
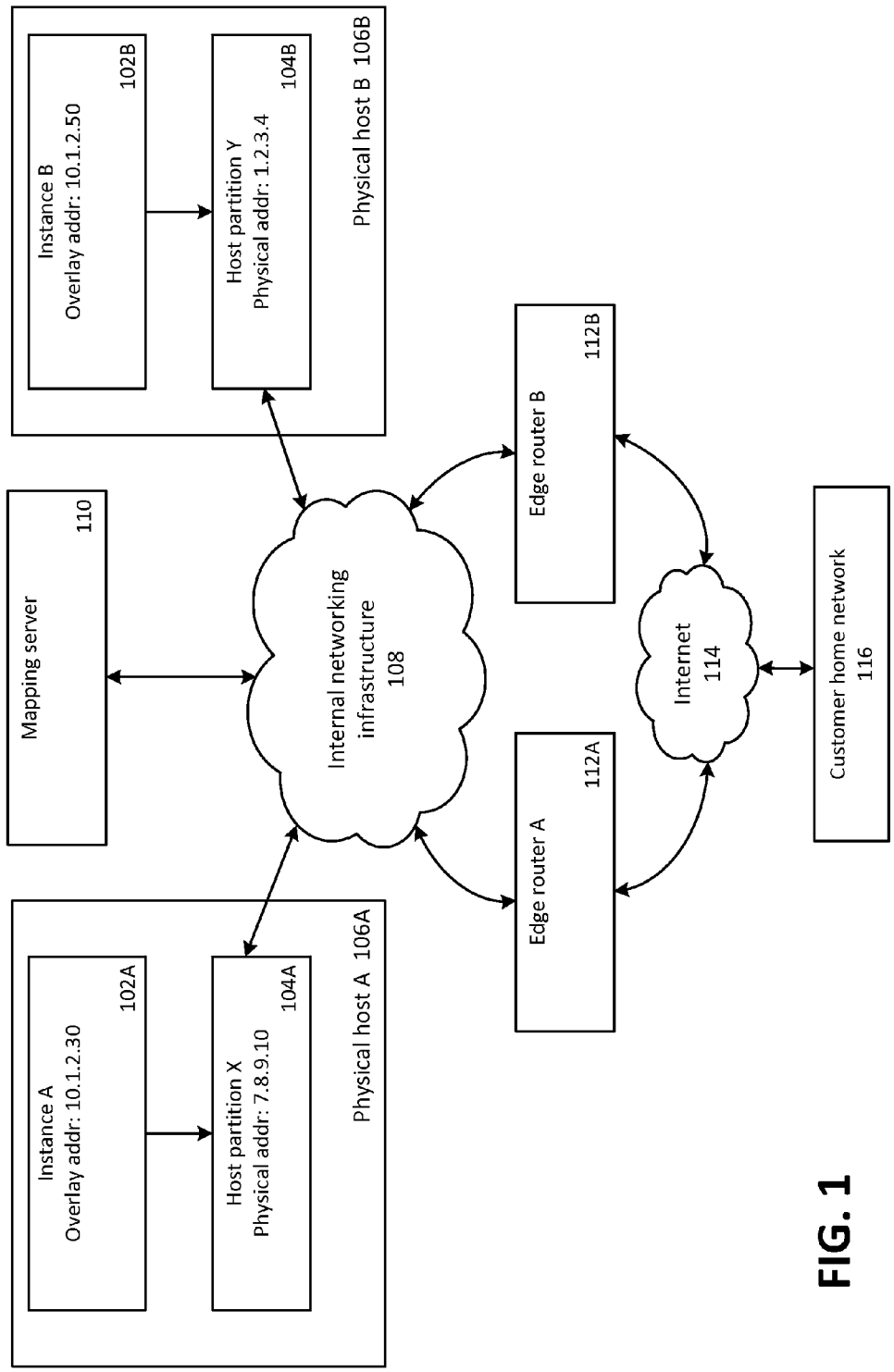
FIG. 1 illustrates an example environment in which embodiments of the invention may be implemented.

Networks that support compute services may need to update the virtual networking framework to a new version or may want to have the ability to run different versions of the framework that have different capabilities. Because there may be so many devices associated with implementing a virtual networking framework, and because a service provider that implements a virtual networking framework may attempt to have at least some of its devices online at all times so that it has constant uptime, it may be infeasible to update and reboot all these devices with the new version virtual networking framework at once (versions are sometimes referred to herein as capabilities). In order to update a virtual networking framework, one technique may be to negotiate the version or capabilities of a virtual networking framework to be used between two computing nodes (sometimes referred to as computers or physical hosts herein) at the time that those two computing nodes are to communicate.

It may be that computing nodes are not configured to send information about their virtual networking framework capabilities (sometimes referred to herein as communication capabilities) to other computing nodes, or are not configured to trust information about virtual networking framework capabilities that are received from other computing nodes. In such embodiments, there may be a central control plane (referred to herein as a mapping server) that is configured to receive from computing nodes an indication of their virtual networking framework capabilities, select among those virtual networking framework capabilities for a communication to occur between two particular computing nodes, and direct those two computing nodes to use the selected virtual networking framework capabilities when communicating with each other.

Three different types of networks are primarily described herein to illustrate aspects of the disclosure. One type of network referenced herein is the physical network itself (which may be referred to as the substrate network). It may be that a physical network is not visible to virtual networks built on top of the physical network, or to virtual machine instances within a service provider that communicate via a virtual network.

A second of type of network referenced herein is an overlay network. An overlay network may be a virtual network that virtual machine instances and other virtual entities use and see. An overlay network generally may not resemble the physical network on which it resides. When a customer configures and deploys a virtual network on the overlay network, the customer may be unaware of how the substrate network is intra connected or what the physical network is using for communications. This overlay network may function, in part, because the edge devices (such as routers, and hosts upon which virtual machine instances execute) are aware of the mapping between a physical network and an overlay network. For example, a host partition of a physical host may intercept, or receive, network packets destined for an instance and rewrite them from identifying a physical network to identifying an overlay network. Routers may perform similar rewriting functions for packets received at them.

A third type of network referenced herein is a virtual cloud (sometimes referred to as a virtual private cloud). A virtual cloud allows a customer to create a network of virtual machine instances (and other devices) set up in a customer-specified topology, and that is not shared with any other customer. The customer may create a VPN (virtual private network) connection to their virtual cloud from their customer home network, thus extending their home network to include the virtual cloud. In a virtual cloud, in addition to creating the network topology of the customer's choice, a customer may address a server as it chooses. The virtual cloud's topology may be entirely virtualized—the routers, firewalls, and hosts may all be virtual. A virtual cloud may be built on top of an overlay network (with the overlay network itself being built on top of the physical network).

A virtual networking framework is a framework that allows communications on a virtual cloud or overlay network to occur through a physical network. A virtual networking framework may include mappings between addresses in the virtual cloud or overlay network and addresses in the physical network, as well as capabilities or versions of the virtual networking framework. In this manner, using a virtual networking framework, virtualized devices, such as virtual machine instances, may operate on the overlay network without having been modified in order to communicate on an overlay network. While embodiments described herein mainly deal with a virtual network built directly on top of a physical network, it may be appreciated that these embodiments may be applied where one network is built on top of another network—such as a first virtual network built on top of a second virtual network (which itself is built on top of a physical network).

Regarding a virtual networking framework, how a virtual networking framework may be implemented and how a virtual networking framework may be used to communicate between various computing nodes (e.g., a computing node in a virtual cloud, a computing node in a VPN network, and a computing node on the general Internet) will now be addressed. A virtual networking framework may be implemented at the networking layer of multiple devices to enable them to rewrite overlay network communications. For instance, a virtual networking framework may be implemented in the host partition of a physical host that supports virtual machine instances. The virtual networking framework in the host partition may intercept packets from the virtual machine instances and ensure that the identification of overlay network addresses in the packets are rewritten into identification of physical addresses. This translation may be done so that the devices of the physical network are given addresses that they understand on the physical network, and may therefore transmit the packets toward their destination. The virtual networking framework may also be implemented on other devices, such as edge routers to ensure that, e.g., NAT and PAT (network address translation and port address translation) work correctly for entities using an overlay network. A mapping service may exist at the physical layer that maps between overlay IP addresses and physical IP addresses.

In using an overlay network with a physical network, an overlay IP address and guest network identifier (GNI) may be encoded into a physical network packet so that the information of the ultimate destination (and source) on the overlay network is preserved. One way to do this is to use IPv6 (Internet Protocol version 6). Another way to do this involves the virtual networking framework and protocols that it supports. An overlay network packet on the virtual networking framework may contain information relevant to the virtual networking framework in the data portion of the IP packet (similar to how a UDP (User Datagram Protocol) packet may be an IP packet with UDP information in the data portion of the IP packet). The data portion in a packet that utilizes this virtual networking framework may contain the data portion of an IP packet generated by the overlay device (this may be a TCP (Transmission Control Protocol) or UDP packet) along with GNI information. The IP header for this original packet may then be reconstructed using information from the data portion (e.g., the data portion may include an identifier of the destination address on the overlay network, and when the packet is transmitted from a physical network device to the destination device on the overlay network—such as from the host partition to the virtual machine instance—the host partition may reconstruct the packet on the overlay network by using the destination address identified in the data portion as the destination address for the packet).

There are several categories of communication that may be implemented using a virtual networking framework, such as: (1) an instance on one virtual cloud may send a packet to an instance on the same virtual cloud (in the same subnet or across subnets); (2) an instance on a virtual cloud may send a packet to a VPN; (3) an instance on a virtual cloud may send a packet to the Internet; (4) an instance on a virtual cloud may receive a packet from the Internet (which may be return traffic or unsolicited traffic); and (5) an instance on a virtual cloud may receive a packet from a VPN (which may be return traffic or unsolicited traffic). Some of these examples are described below to illustrate how a virtual networking framework may operate.

How these categories of communication may be implemented in a computing environment that supports a virtual networking framework will now be addressed with reference to FIG. 1. FIG. 1 illustrates an example environment in which embodiments of the invention may be implemented. It may be that embodiments that implement using selected capabilities of virtual networking frameworks may deal with communications between two virtual machine instances, or, where communications are sent between an instance and the Internet or a VLAN, communications between the instance and an edge device between the instance and the Internet or VLAN. With that in mind, how some additional communications may be implemented is described herein to give a fuller picture of how a virtual networking framework may operate.

The following is an example of an instance on a virtual cloud communicating with another instance on the same virtual cloud, and the same subnet.

(1) Instance A 102A, which has an address on an overlay network of 10.1.2.30, sends a packet destined for instance B 102B, which has an address on the overlay network of 10.1.2.50.

(2) Since instance A 102A is a virtual machine instance, the packet is received by the host partition. Host partition X 104A will rewrite the packet before forwarding it toward instance B 102B. Host partition X 104A first determines which physical host is hosting instance B 102B.

(3) Host partition X 104A queries mapping server 110 with a VARP (Virtual Address Resolution Protocol) request. The VARP request includes a request to determine whether instance A 102A is on the same virtual cloud as instance B 102B (e.g., if 10.1.2.30 is allowed to communicate with 10.1.2.50), a request for the VARP information for the physical host that 10.1.2.50 resides on, and a request for the physical address of the physical host (4) Host partition X 104A receives a response from mapping server 110.

(5) Physical host A 106A constructs a packet using the virtual networking framework that contains a source address of 7.8.9.10 and a destination address of 1.2.3.4, and the data portion of the packet contains GNI information along with the original packet. Also, host partition X 104A may provide instance A 102A with the VMAC (Virtual Media Access Control) address for instance B 102B.

(6) Physical host B 106B receives the packet from physical host A 106A across internal networking infrastructure 108 and extracts the original packet from the data portion of the packet in the virtual networking framework. However, before physical host B 106B performs additional operations on the packet, it may verify with the mapping server 110 that 10.1.2.30 and 10.1.2.50 are on the same virtual cloud and permitted to communicate with each other.

(7) Having received a response from mapping server 110 that this is a legitimate and valid request, physical host B 106B constructs a valid IP packet from the data portion of the packet in the virtual networking framework it receives. This valid IP packet resembles the packet originally sent in step 1. Host partition Y 104B then forwards this packet to the destination—instance B 102B.

The following is an example of an instance on a virtual cloud communicating with another instance on the same virtual cloud, and a different subnet. Customers may configure multiple subnets within their virtual cloud. However, since the overlay topology may differ from the physical topology, there may be a phantom router implemented in the virtual cloud to route packets between instances in the virtual cloud. This phantom router may be implemented in software at the host partition X 104And mapping server 110 levels.

Where a virtual cloud has multiple subnets, mapping server 110 may configure a phantom router that exists on that network's x.x.x.1 device (e.g., using the 10.1.2.30 and 10.1.2.50 example above, this may be a device with address 10.1.2.1).

(1) On the overlay network, instance A 102A, which has an address on an overlay network of 10.1.2.30, begins to send a packet destined for instance B 102B, which has an address on the overlay network of 10.1.2.50. Instance A 102A sends an ARP request to 10.1.2.1.

(2) Since instance A 102A is a virtual machine instance, the packet is received by the host partition. Host partition X 104A receives this ARP request, and sends a VARP request to mapping service for 10.1.2.1. At this point, host partition X 104A is not aware that 10.1.2.1 is a phantom router.

(3) Mapping server 110 returns a VMAC address for 10.1.2.1 to host partition X 104A, and the VMAC address is tagged as a phantom router.

(4) Host partition X 104A then sends this phantom router information to instance A 102A.

(5) Instance A 102A then constructs a packet to send to instance B 102B via the phantom router, 10.1.2.1. Instance A 102A sends this packet, which is received by host partition X 104A.

(6) Host partition X 104A is aware that 10.1.2.1 is a phantom, because it received an indication of such from mapping server 110, so host partition X 104A performs a second lookup on the destination address of 10.1.2.50.

(7) From this point forward, the operations follow the operations for communicating between instances on the same virtual cloud and the same subnet as described above, starting with operation (5) ("Physical host A 106A constructs a packet using the virtual networking framework that contains a source address of 7.8.9.10 and a destination address of 1.2.3.4 . . . ").

The following is an example of an instance on a virtual cloud communicating with a VPN. Traffic to and from a VPN may introduce operations performed by an edge router (such as edge router A 112A) that bridges the overlay and physical networks, that is aware of the virtual networking framework, and that can rewrite packets to and from a virtual cloud. The communication flow for a packet from an instance to a VPN may be similar to the communication flow for a packet between two instances on the same virtual cloud and different subnets. The VPN may have a virtual instantiation on the virtual cloud, which may be on a different subnet. There are multiple approaches to processing this communication, such as:

(1) If the host partition is aware of VPNs, then the host partition may construct a packet in the virtual networking framework containing the VPN packet, and routes this packet to the appropriate edge router that services the VPN for that virtual cloud (in embodiments where there is one VPN egress point per customer).

(2) If the host partition is not aware of VPNs, then the host partition may construct a packet in the virtual networking framework containing the VPN packet, and routes this packet to the host partition's local edge router for appropriate handling. Where this edge router happens to be the edge router that services the VPN, the edge router may send the packet to the VPN. Where this edge router is not the edge router that services the VPN, this edge router may send the packet to the edge router that does service the VPN, which may then send the packet to the VPN (such as edge router A 112A sending the packet to edge router B 112B).

In either of these approaches, the edge router that services the VPN for that virtual cloud receives the packet in the virtual networking framework (which contains the VPN packet) on its internal interface. The edge router may query the mapping server 110, and cache the received mapping. The cached mapping may also contain GNI information so that the edge router knows how to correctly rewrite return packets from the VPN to the instance. The edge router may not be performing a NAT function where it is merely extracting the VPN packet from the packet in the virtual networking framework it received, reconstructing IP headers so that the VPN packet appears to be from the instance, and noting the GNI information to use later for return packets. When the packet is received on the customer home network 116 via Internet 114, the packet source address appears as the overlay network address of the instance—there is no visibility into the physical network.

Communications from an instance on a virtual cloud to the Internet may be performed in a similar manner as the VPN example, above. A difference in this scenario may be that the edge router may be rewriting packets in the virtual networking framework and performing either NAT or PAT.

For return traffic from the Internet 114 to an instance on a virtual cloud, the following may occur. If the edge router receives a packet from the Internet for which it has a state table entry, then the packet may be un-NAT'ed or un-Pat'ed appropriately and encapsulated into a packet in the virtual networking framework. The edge router may then send the packet to the appropriate physical network entity with the appropriate GNI incorporated into the packet in the virtual networking framework.

For unsolicited (as opposed to return) traffic from the Internet to an instance on a virtual cloud, the following may occur. If the edge router receives a packet from the Internet and there is no corresponding state table entry, it may be assumed that the packet is invalid, and the edge router may drop the packet. If there is a valid state table entry (because the customer is using a static IP address that remaps to another instance in case of failure of a first instance), then the packet may be treated the same as return traffic from the Internet to an instance on a virtual cloud, as described above.

For return traffic from a VPN to an instance on a virtual cloud, the following may occur. If the edge router servicing the VPN receives a packet from the customer home network 116 for which there is a state table entry, then the packet is appropriately encapsulated into a packet in the virtual networking framework, including physical network addressing and GNI information, and then forwarded to the appropriate device on the physical network. It may be that there is no NAT or PAT performed on the VPN connection.

For unsolicited traffic from a VPN to an instance on a virtual cloud, the following may occur. If the edge router servicing the VPN receives a packet from the customer home network 116 for which there is no state table entry, then the edge router may query the mapping server 110 for the virtual cloud to determine a corresponding physical network address for the overlay network address (that is, the address of the instance on the virtual cloud).

If the mapping server 110 has an entry for this overlay address, this information is returned to the edge router. The edge router may then encapsulate the VPN packet into a packet in the virtual networking framework including physical network addressing and GNI information and forwards the packet on.

If the mapping server 110 does not have an entry for this overlay address, the mapping server 110 may return an indication of this to the edge router. The edge router may then drop the packet. This is because the instance identified by that overlay address may or may not have existed in the past, but there currently is no instance with that overlay address.

Figure 2:
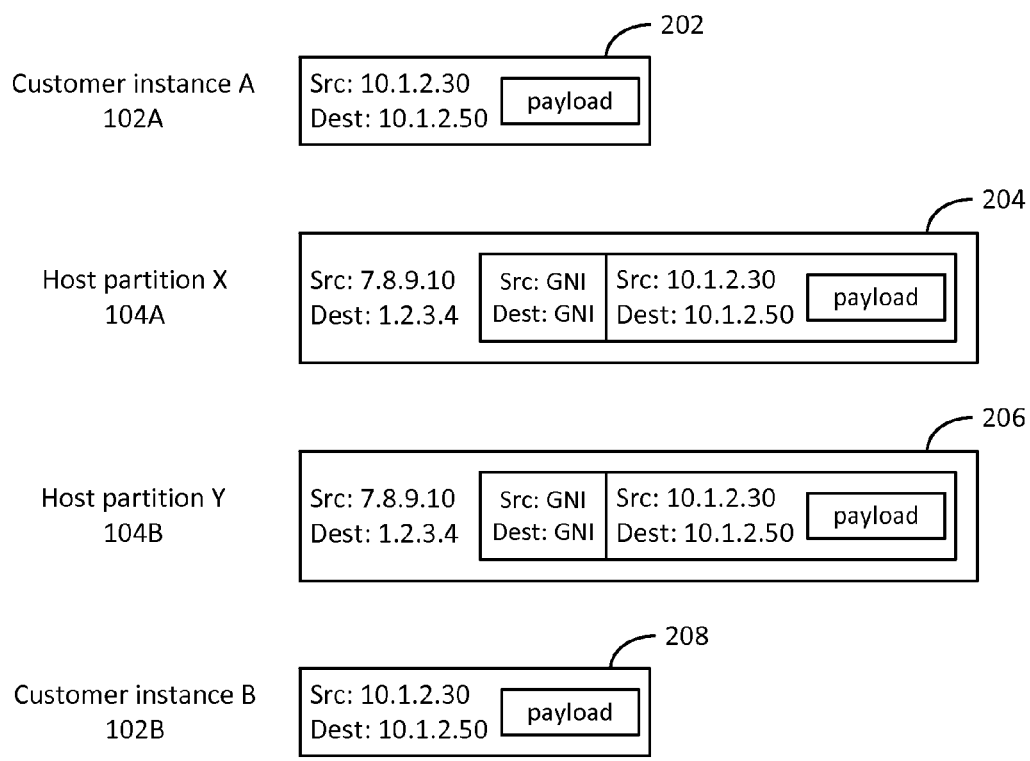
FIG. 2 depicts example network packets as a packet is generated and sent from one virtual machine instance hosted on one physical host to a second virtual machine instance hosted on a second physical host.

FIG. 2 depicts example network packets as a packet is generated and sent from one virtual machine instance hosted on one physical host to a second virtual machine instance hosted on a second physical host. For example, these may be network packets generated by elements of FIG. 1, as customer instance A 102A generates a packet destined for customer instance B 102B, and this packet is modified and transmitted along its path by host partition X 104A and host partition Y 104B.

The example packets of FIG. 2 continue with the example addressing scheme of FIG. 1, where customer instance A 102A has a network address of 10.1.2.30 on an overlay network and a network address of 7.8.9.10 on a corresponding physical network (the physical network address of 7.8.9.10 being depicted as part of host partition X 104A because customer instance A 102A may be unaware of this physical network or physical network address). Similarly, customer instance B 102B has a network address of 10.1.2.50 on the overlay network, and a network address of 1.2.3.4 on the corresponding physical network (the physical network address of 1.2.3.4 being depicted as part of host partition Y 104B because customer instance B 102B may be unaware of this physical network or physical network address).

Packet 202 is an example packet as it is generated by customer instance A 102A. Packet 202 identifies the source of the packet as 10.1.2.30, the destination of the packet as 10.1.2.50, and contains a data payload.

Packet 204 is an example packet depicting how host partition X 104A may modify packet 202 upon receiving it. Host partition X modifies packet 202 to generate packet 204 by encapsulating packet 202 with a virtual networking framework header that identifies physical network address 7.8.9.10 as corresponding to overlay network address 10.1.2.30, and identifies physical network address 1.2.3.4 as corresponding to overlay network address 10.1.2.50. Since 10.1.2.30 is the source network address identified in packet 202, corresponding physical network address 7.8.9.10 is the source network address identified in packet 204. Likewise, since 10.1.2.50 is the source network address identified in packet 202, corresponding physical network address 1.2.3.4 is the source network address identified in packet 204. Packet 204 also differs from packet 202 in that host partition 104A has added a source and destination global network identifier (GNI) to the packet. A GNI may be a customer identifier that uniquely identifies a customer among customers that host instances at a particular service provider. A GNI may be used where two different customers have virtual machine instances hosted on the same host, and these two virtual machine instances may have the same IP address.

Packet 206 depicts packet 204 as it is received by host partition Y 104B from host partition X 104A. Here, packet 206 is depicted as being the same as packet 204 because it has not been modified between host partition X 104A and host partition Y 104B. In embodiments, the packet may be modified between host partition X 104A and host partition Y 104B (such as by encapsulating it for transmission on another network), but the packet is returned into the condition that it was in when it left host partition X 104A as it reaches host partition Y 104B.

Host partition Y 104B then modifies packet 206 to produce packet 208. This may comprise removing encapsulation information (of source 7.8.9.10, destination 1.2.3.4 and GNI information for the source and destination) from packet 206 so that packet 208 is the same as packet 202.

Figure 3:
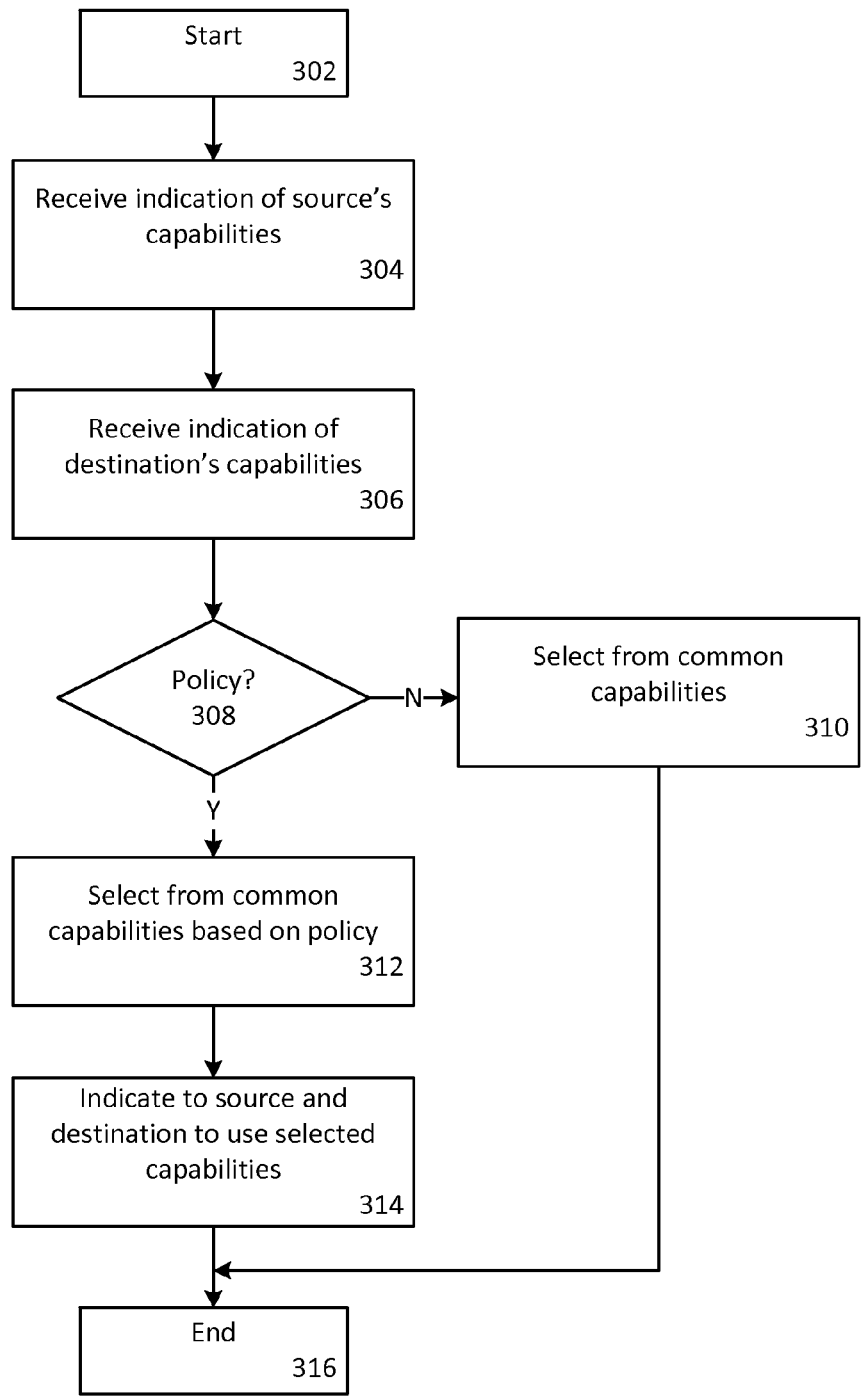
FIG. 3 depicts example operating procedures for a mapping server, according to embodiments.

FIG. 3 depicts example operating procedures for a mapping server, according to embodiments. The operating procedures of FIG. 3 may be implemented in conjunction with the operating procedures of FIG. 4 (which are operating procedures for a source host partition, according to embodiments), and the operating procedures of FIG. 5 (which are operating procedures for a destination host partition, in embodiments). In embodiments, the operating procedures of FIG. 3 may be implemented in mapping server 110 of FIG. 1. It may be appreciated that there are embodiments of FIG. 3 (and FIGS. 4-5) that implement more or fewer operations than are depicted here, or that implement operations in a different order than is depicted here. For example, there may be embodiments that implement operating procedures such that operation 306 occurs before operation 304.

It may be appreciated that the embodiments described herein mainly deal with determining virtual networking framework capabilities for two physical hosts to use when their respective virtual machine instances are communicating, these techniques are not limited to such embodiments. These techniques may be applied to other computing nodes that communicate via virtual networking frameworks, such as switches and edge routers.

The operating procedures of FIG. 3 begin with operation 302, and move to operation 304. Operation 304 depicts receiving an indication of the source host's virtual networking framework capabilities. This may occur, for example, in response to the mapping server querying the source host for its capabilities, or the source host sending an indication of its capabilities to the mapping server at a predetermined periodic time, or when the source host boots up. Examples of these capabilities may include a version of a protocol or a protocol to use. The capabilities may include a format to use when encoding the packet for transmission over a physical network (a wire format), a change in the size of a field in bits or an order in which fields appear in packets (e.g., switching the order that the source and destination address fields appear in a packet), whether encryption is required or disallowed, integrity checks, whether to use compression, and an indication of a configuration for flow control. After operation 304, the operating procedures of FIG. 3 move to operation 306.

Operation 306 depicts receiving an indication of the destination host's capabilities. Operation 306 may be implemented in a manner similar to operation 304. After operation 306, the operating procedures of FIG. 3 move to operation 308.

Operation 308 depicts determining whether there is a policy that deals with communications between the source and destination. A policy may affect whether certain capabilities that both the source and the destination have are used in their communications. For example, all computing nodes on a network may be updated at the same time to use version 2.0 of a virtual networking capability, in addition to version 1.0. Even though all nodes support version 2.0, a policy may indicate that two nodes are not to use this new version in a production environment, but only in a testing environment. Thus, when two particular nodes are to communicate with each other as part of a production environment, the policy may indicate that they are to use version 1.0, even though they both support version 2.0. Another example of a policy may be that particular capabilities are to be used only for certain customers. In embodiments, policies may be set by an administrator of a mapping server, or by a customer. Where there is a policy that deals with communications between the source and destination, the operating procedures of FIG. 3 move to operation 312. Where there is not a policy that deals with communications between the source and destination, the operating procedures of FIG. 3 move to operation 310.

Operation 310 depicts selecting from the common capabilities of the source and destination (without regard to a policy). Where the capabilities are versions of a virtual networking framework, selecting capabilities may comprise selecting the highest version that is common to both hosts. For example, where one host implements versions 1.0, 1.1 and 3.0 of a virtual networking framework, and another host implements versions 1.0, 1.1 and 2.0 of a virtual networking framework, this may comprise selecting version 1.1 of the virtual networking framework for use by the two hosts in communicating with each other. Here, neither version 2.0 nor 3.0 is selected, because only one of the two hosts implements that version, and version 1.0 is not selected even though both hosts implement it, because it is not the highest common version, since both hosts also implement version 1.1.

Where the capabilities are several features, selecting the capabilities may comprise selecting the features common to both hosts. Where the capabilities are different virtual networking frameworks that do not have an inherent order in the manner that multiple versions of a single framework have, selecting the capabilities may comprise the mapping server referring to a policy of which of these different virtual networking frameworks to select when they are present. In embodiments, selecting the capabilities may comprise receiving user input that identifies the selected communication capability. After operation 310, the operating procedures of FIG. 3 move to operation 314.

In embodiments, virtual networking framework capabilities may be selected to be used by two hosts for all of their communications with possibly differing virtual machine instances on those hosts. In other embodiments, virtual networking framework capabilities may be selected on a per virtual machine instance basis—that two virtual machine instances on two physical hosts may have one set of virtual networking framework capabilities used for their communications, and two other virtual machine instances on those same two physical hosts may have a different set of virtual networking framework capabilities used for their communications.

Operation 312 depicts selecting from the common capabilities of the source and destination, with regard to a policy. This operation may be implemented in a similar manner as operation 310, with the added requirement that the selected capabilities must adhere to a policy. For example, where in operation 310, version 3.0 of a protocol would be selected, but the policy indicates that version 3.0 is not to be used, operation 312 may be implemented in a similar manner as operation 310 as though version 3.0 was not a capability indicated by either the source or destination. After operation 312, the operating procedures of FIG. 3 move to operation 314.

Operation 314 depicts indicating to the source and destination to use the selected capabilities for communications between the source and destination. For example, where these selected capabilities are a version of a virtual networking framework and the latest version that each host supports is the same version, this may comprise the mapping server indicating to each host to use the latest version of the virtual networking framework in communications with each other. Where these indicated capabilities are sets of features, this operation may likewise comprise the mapping server indicating to each host to use those sets of features. In embodiments, the mapping server may send the source and destination different selected capabilities (e.g., the source is to encrypt when sending to the destination, and the destination is to use plaintext when sending back to the source). In other embodiments, the mapping server may indicate the capabilities to only the source, and the destination may determine the selected capabilities based on packets received from the source. After operation 310, the operating procedures of FIG. 3 move to operation 316 where they end.

Figure 4:
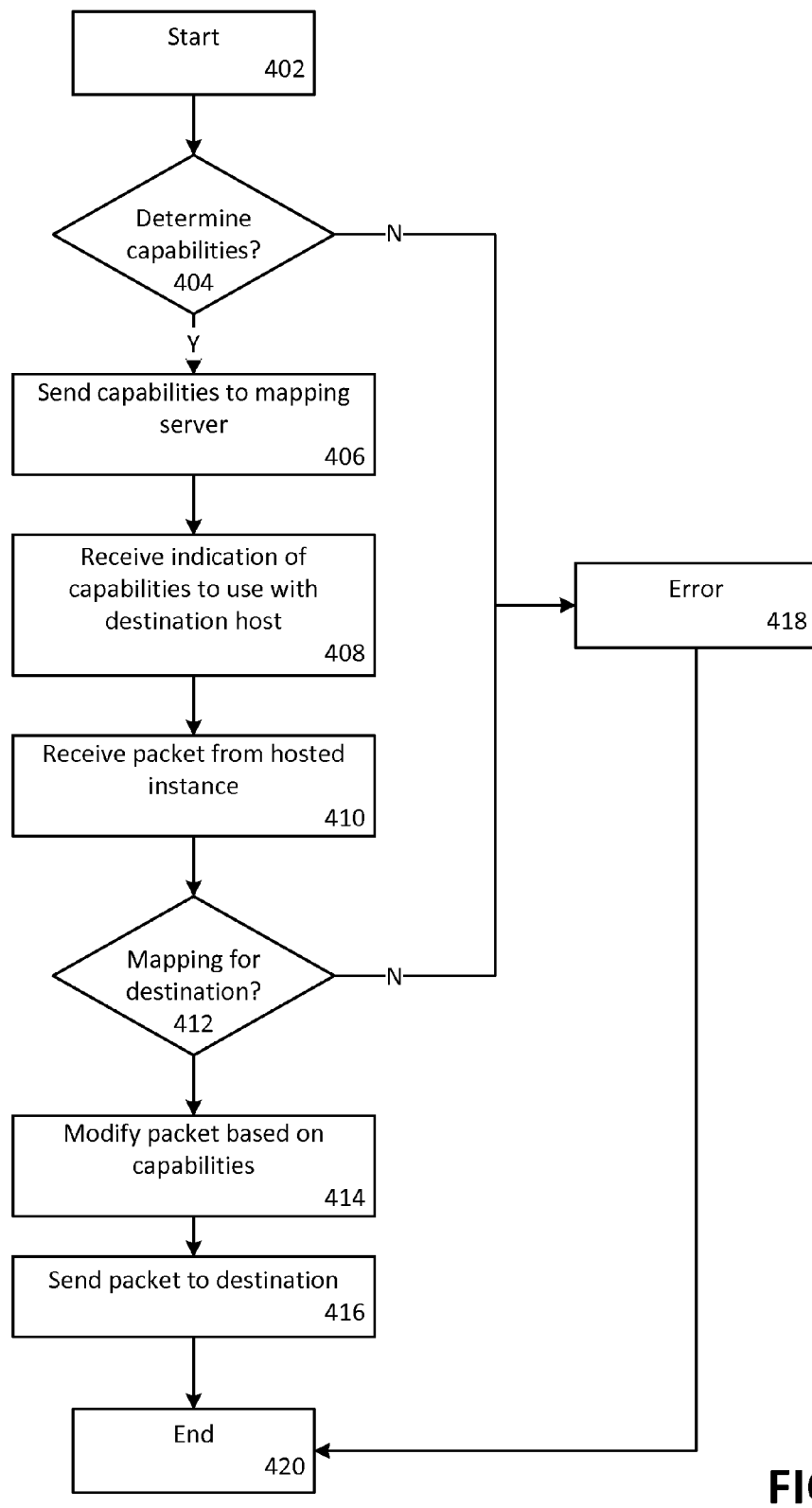
FIG. 4 depicts example operating procedures for a source physical host, according to embodiments.

FIG. 4 depicts example operating procedures for a source physical host, according to embodiments. In embodiments, the operating procedures of FIG. 4 may be implemented in host partition X 104A of FIG. 1. The operating procedures of FIG. 4 begin with operation 402, and move to operation 404.

Operation 404 depicts attempting to determine the virtual networking framework capabilities of the source physical host. This may comprise the source physical host looking for a virtual networking framework process that executes on the source physical host and querying that process for its version or capabilities. Where these virtual networking framework capabilities are determined, the operating procedures of FIG. 4 move to operation 406. Where these virtual networking framework capabilities are not determined, the operating procedures of FIG. 4 move to operation 418, where an error is raised.

Operation 406 depicts sending the determined virtual networking framework capabilities to a mapping server. These determined virtual networking capabilities may be virtual networking capabilities that were successfully determined in operation 404. After operation 406, the operating procedures of FIG. 4 move to operation 408.

Operation 408 depicts receiving an indication of virtual networking framework capabilities to use when communicating with the destination physical host. This indication may be received from a mapping server, which makes the determination of which virtual networking framework capabilities to use in this communication in operation 312 of FIG. 3. After operation 408, the operating procedures of FIG. 4 move to operation 410.

Operation 410 depicts receiving a network packet from a virtual machine instance hosted on the source physical host that is destined for a destination virtual machine instance hosted on the destination physical host. This may be considered to be intercepting the network packet because the virtual machine instance is configured to put the network packet on a physical network interface card, while the packet is actually placed on a virtual network interface card as part of the virtualization process. Where the host partition provides a hypervisor-type functionality to the virtual machine instance hosted on the source physical host, this host partition may provide a shared memory area to the virtual machine instance as part of virtualizing a network interface card (NIC) to the virtual machine instance. When the virtual machine instance attempts to send a network packet to a destination, the virtual machine instance may write the network packet to this shared memory area, where it may be received by the host partition, since the shared memory area is shared between the virtual machine instance and the host partition. After operation 410, the operating procedures of FIG. 4 move to operation 412.

Operation 412 depicts determining whether there is a mapping for the destination virtual machine instance. This may comprise determining the destination address in the overlay network that is indicated in the network packet, and querying the mapping server for a corresponding network address in the physical network. Where it is determined that there is a mapping for the destination virtual machine instance, the operating procedures of FIG. 4 move to operation 414. Where it is determined that there is not a mapping for the destination virtual machine instance, the operating procedures of FIG. 4 move to operation 418, where an error is raised.

Operation 414 depicts modifying the network packet received from the virtual machine instance hosted on the source physical host that is destined for the destination virtual machine instance hosted on the destination physical host, based on the capabilities indicated in operation 408. This may be similar to modifying packet 202 to packet 204 in FIG. 2. After operation 414, the operating procedures of FIG. 4 move to operation 416.

Operation 416 depicts sending the modified network packet to the destination physical host. This may comprise host partition X 104A sending the modified packet to host partition Y 104B via internal networking infrastructure 108 in FIG. 1. After operation 416, the operating procedures of FIG. 4 move to operation 420, where the operating procedures of FIG. 4 end.

Operation 418 depicts raising an error. Operation 418 may be reached from operation 404 (where the virtual networking framework capabilities of the source physical host cannot be determined), or operation 412 (where there is not a valid mapping for the destination physical host). In response to the error being raised, the host partition may, for example, drop the packet received from the virtual machine instance and perform no further actions on it. After operation 418, the operating procedures of FIG. 4 move to operation 420, where the operating procedures of FIG. 4 end.

Figure 5:
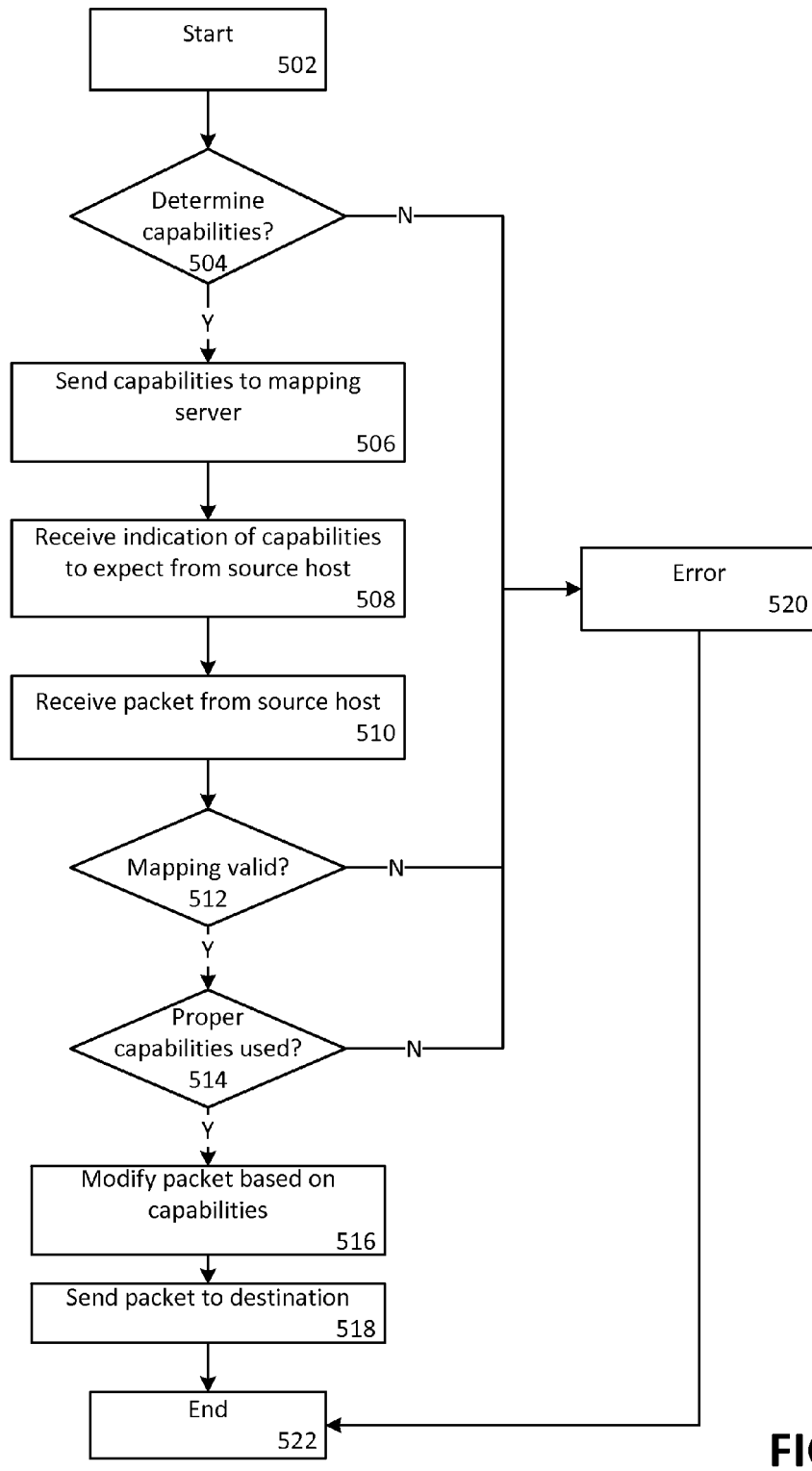
FIG. 5 depicts example operating procedures for a source physical host, according to embodiments.

FIG. 5 depicts example operating procedures for a destination physical host, according to embodiments. In embodiments, the operating procedures of FIG. 5 may be implemented in host partition Y 104B of FIG. 1. The operating procedures of FIG. 5 begin with operation 502, and move to operation 504.

Operation 504 depicts attempting to determine the virtual networking framework capabilities of the destination physical host. This operation may be implemented in a similar manner as operation 404 of FIG. 4. Where these virtual networking framework capabilities are determined, the operating procedures of FIG. 5 move to operation 506. Where these virtual networking framework capabilities are not determined, the operating procedures of FIG. 5 move to operation 520, where an error is raised.

Operation 506 depicts sending the determined virtual networking framework capabilities to a mapping server. This operation may be implemented in a similar manner as operation 406 of FIG. 4. After operation 506, the operating procedures of FIG. 5 move to operation 508.

Operation 508 depicts receiving an indication of virtual networking framework capabilities to expect when communicating with the source physical host. This operation may be implemented in a similar manner as operation 408 of FIG. 4. Additionally, these capabilities may be capabilities that the source host will use when modifying network packets to send to the destination host, but not vice versa. In such cases, the destination host may use the indication of these capabilities to know how to validate or decode received packets. In embodiments, both the source and destination hosts use the same capabilities when communicating with each other. In other embodiments, the source and destination hosts may use different capabilities when sending packets to each other. For example, the source host may use encryption when sending packets to the destination host, and the destination host may use plaintext when sending packets to the source host. After operation 508, the operating procedures of FIG. 5 move to operation 510.

Operation 510 depicts receiving a network packet from the source physical host, that was originated on a source virtual machine instance hosted on the source physical host, and that is destined for a destination virtual machine instance hosted on the destination physical host. In the environment of FIG. 1, this may be, for instance, host partition Y 104B receiving a network packet from host partition X 104A (that was originated by instance A 102A) via internal networking infrastructure 108. After operation 510, the operating procedures of FIG. 5 move to operation 512.

Operation 512 depicts determining whether the mapping used is valid. This may comprise determining the indicated overlay network source and destination addresses and physical network source and destination addresses in the packet. Then, the mapping server may be queried for the correct mappings, such as by sending the mapping server the overlay addresses and comparing the received mapping against the physical addresses indicated in the packet. Where it is determined that the mapping used is valid, the operating procedures of FIG. 5 move to operation 514. Where it is determined that the mapping used is invalid, the operating procedures of FIG. 5 move to operation 520, where an error is raised.

Operation 514 depicts determining whether the proper virtual networking framework capabilities were used in the received network packet. The proper virtual networking framework capabilities to use in this communication may be those virtual networking framework capabilities indicated by the mapping server in operation 508. The destination host partition may analyze the received packet to determine whether these capabilities were, in fact, used. For example, where the indicated capabilities include encryption, the destination host partition may determine whether this packet is encrypted. Where the packet includes metadata that indicates the capabilities used in modifying this packet for the virtual networking framework by the source host partition, this may include checking those capabilities indicated in the packet against the proper virtual networking framework capabilities indicated by the mapping server. Where it is determined that the proper virtual networking framework capabilities were used in the received network packet, the operating procedures of FIG. 5 move to operation 516. Where it is determined that the proper virtual networking framework capabilities were not used in the received network packet, the operating procedures of FIG. 5 move to operation 520, where an error is raised.

Operation 516 depicts modifying the network packet received from the source physical host that is destined for the destination virtual machine instance hosted on the destination physical host, based on the capabilities indicated in operation 508. This operation may comprise, for example, modifying packet 206 of FIG. 2 to produce packet 208 of FIG. 2. After operation 514, the operating procedures of FIG. 5 move to operation 518.

Operation 518 depicts sending the modified network packet to the destination virtual machine instance. Using the example architecture described with respect to operation 410 of FIG. 4, operation 518 may comprise writing the modified network packet to a shared memory area that is shared with the destination virtual machine instance and which is part of a virtual network interface card (NIC) for that destination virtual machine instance and indicating to the destination virtual machine instance that it has received a network packet. After operation 518, the operating procedures of FIG. 5 move to operation 522, where the operating procedures of FIG. 5 end.

Operation 520 depicts raising an error. Operation 520 may be reached from operation 504 (where the virtual networking framework capabilities of the destination physical host cannot be determined), operation 512 (where there is not a valid mapping used in the received network packet) or operation 514 (where the proper virtual networking framework capabilities were not used in the received network packet). Where an error is raised stemming from analyzing a received network packet (such as in operations 512 or 514), the received network packet may be dropped and not sent to the destination virtual machine instance. After operation 520, the operating procedures of FIG. 5 move to operation 522, where the operating procedures of FIG. 5 end.

Figure 6:
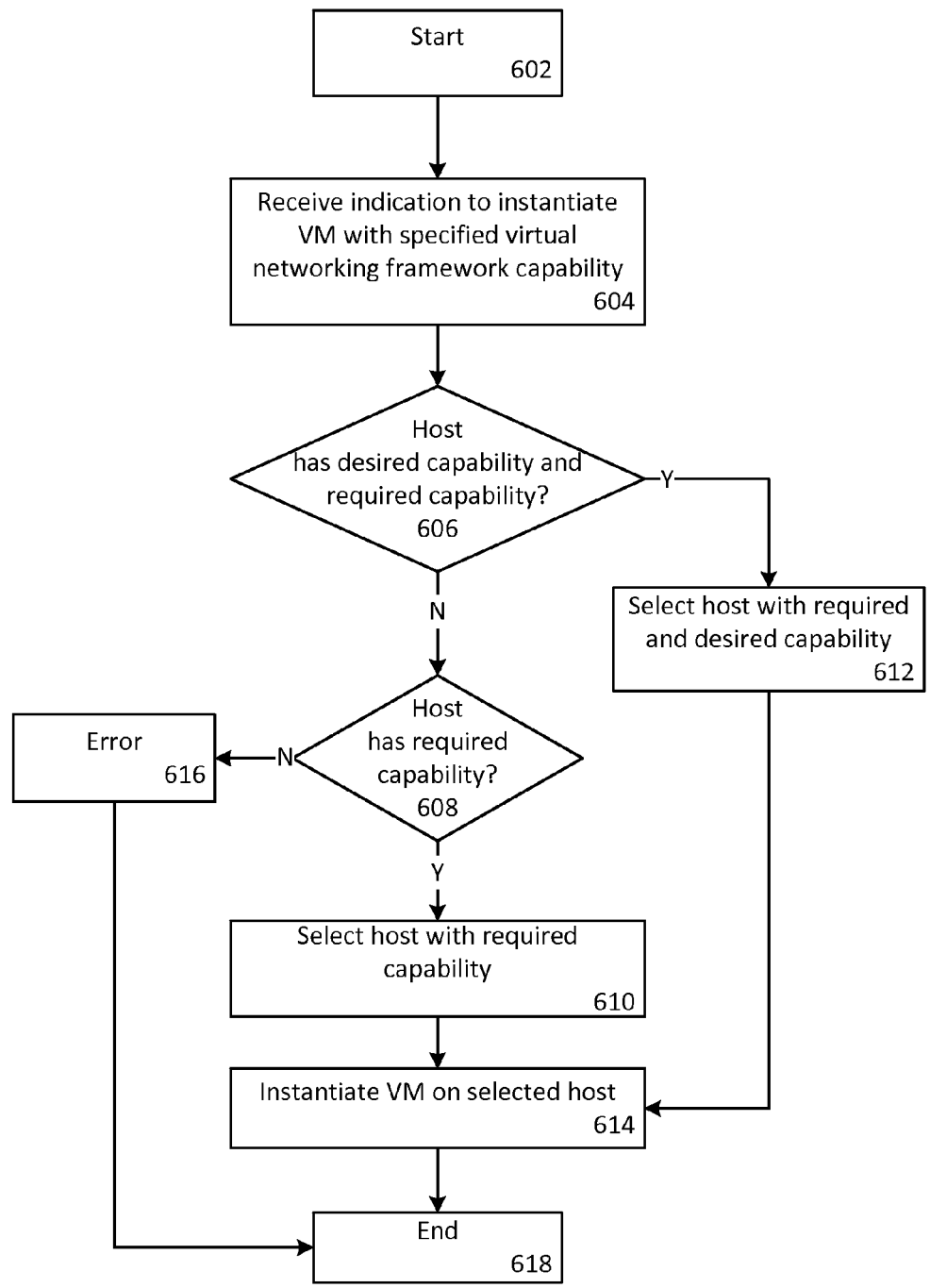
FIG. 6 depicts example operating procedures for placing a virtual machine instance according to its required and desired virtual networking framework capabilities.

FIG. 6 depicts example operating procedures for placing a virtual machine instance according to its required and desired virtual networking framework capabilities. In embodiments, the operating procedures of FIG. 6 may be implemented by a computing node that makes placement decisions for virtual machine instances among a plurality of physical hosts, such as management component 810 of server computer 804 of FIG. 8. The operating procedures of FIG. 6 begin with operation 602 and move to operation 604.

Operation 604 depicts receiving an indication to instantiate a virtual machine on a physical host that has both a specified required virtual networking framework capability and a desired virtual networking framework capability. In embodiments, only required or only desired virtual networking framework capabilities may be specified. This indication may be received from a customer that is instantiating the virtual machine instance. After operation 604, the operating procedures of FIG. 6 move to operation 606.

Operation 606 depicts determining whether any hosts of a plurality of physical hosts support both the desired and required virtual networking capabilities. If there is at least one host that supports both the desired and required virtual networking capabilities, then the operating procedures of FIG. 6 move to operation 612. If there is not at least one host that supports both the desired and required virtual networking capabilities, then the operating procedures of FIG. 6 move to operation 608.

Operation 608 depicts determining whether any hosts of the plurality of physical hosts supports the required virtual networking capabilities. If there is at least one host that supports the required virtual networking capabilities, then the operating procedures of FIG. 6 move to operation 610. If there is not at least one host that supports the required virtual networking capabilities, then the operating procedures of FIG. 6 move to operation 616.

Operation 610 depicts selecting a host of the plurality of physical hosts that has the required capability. Where there is only one host that has the required capability, this operation may comprise selecting this host if the host has available load to execute the virtual machine instance, and returning an error otherwise. Where there are multiple hosts that have the required capability, this operation may comprise selecting among the multiple hosts such as based on the host with the most available load, a round-robin selection policy, or similar placement determinations. In embodiments, additional considerations may be taken into account in determining a host on which to place the instance. For example, selecting the host may involve determining that the host has sufficient capacity to handle the load of the new instance. Additionally, a policy decision may be incorporated in selecting the host. For example, it may be a policy to try to avoid placing one customer's instances on the same physical rack of hosts, because the customer may be executing multiple instances to increase reliability, and where these instances are placed on a single rack, that single rack becomes a single point of failure, such as due to a power failure. After operation 610, the operating procedures of FIG. 6 move to operation 614.

Operation 612 depicts selecting a host of the plurality of physical hosts that has the required and desired capability. Operation 612 may be implemented in a similar manner as operation 610 is implemented. After operation 612, the operating procedures of FIG. 6 move to operation 614.

Operation 614 depicts instantiating the virtual machine instance on the selected host. This may comprise copying a virtual machine image file to the selected host and instructing instance manager 808 of FIG. 8 to instantiate a virtual machine instance from the copied virtual machine image file. After operation 614, the operating procedures of FIG. 6 move to operation 618, where the operating procedures of FIG. 6 end.

Operation 616 depicts raising an error. This may comprise sending the customer (that requested instantiating the virtual machine instance in operation 604) an indication that a virtual machine instance could not be placed on a physical host that meets the customer's required and desired virtual networking framework capabilities. After operation 616, the operating procedures of FIG. 6 move to operation 618, where the operating procedures of FIG. 6 end.

Figure 7:
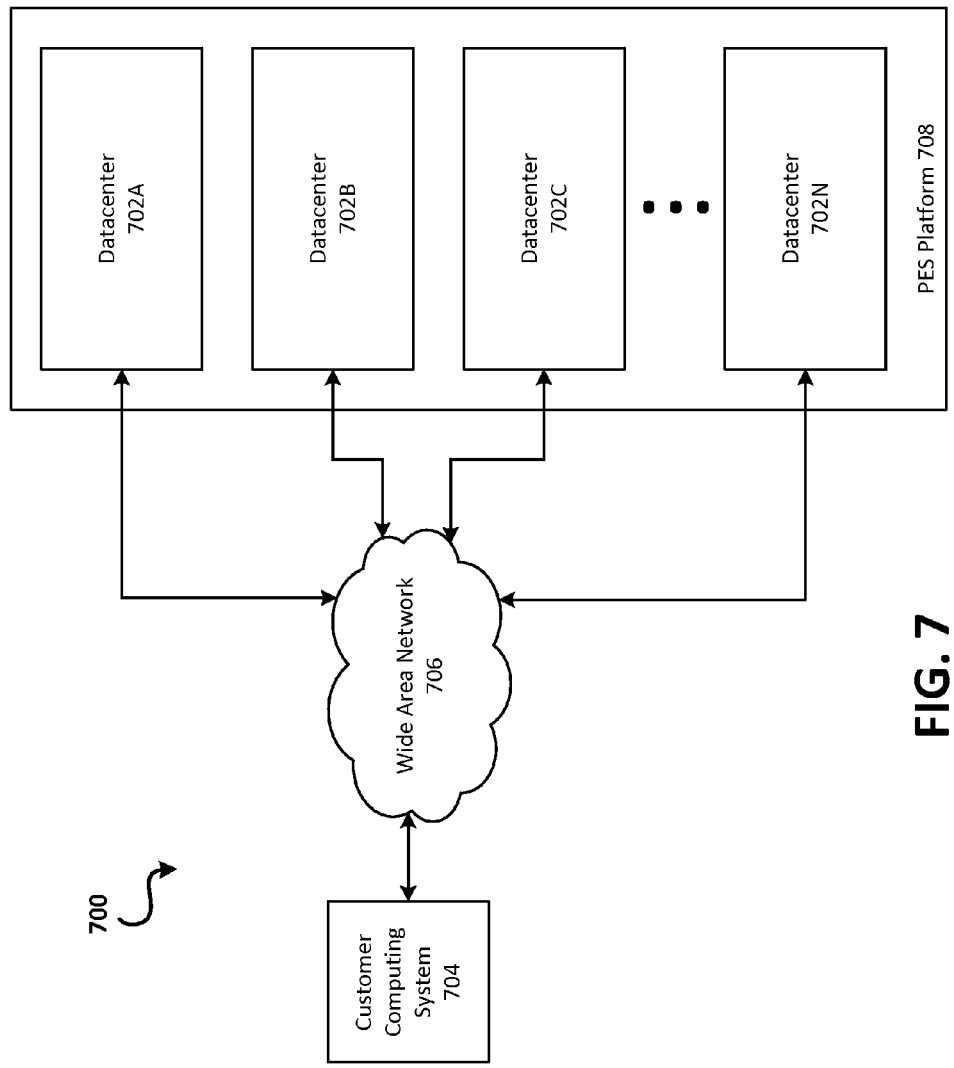
FIG. 7 depicts an example of a suitable computing environment in which embodiments described herein may be implemented.
Figure 8:
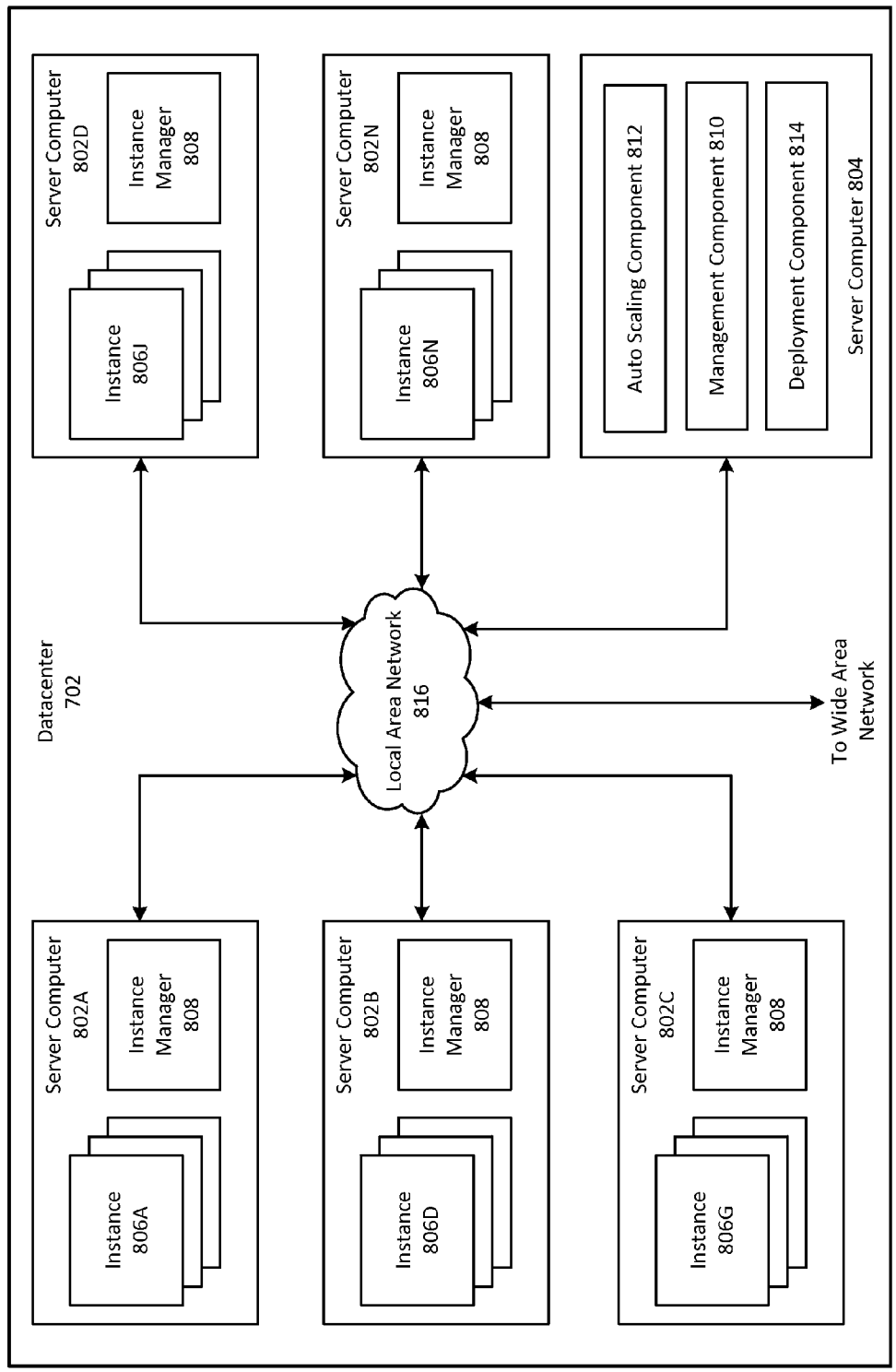
FIG. 8 depicts a computing system diagram that illustrates one configuration for datacenter 602 that implements compute service platform 608.
Figure 9:
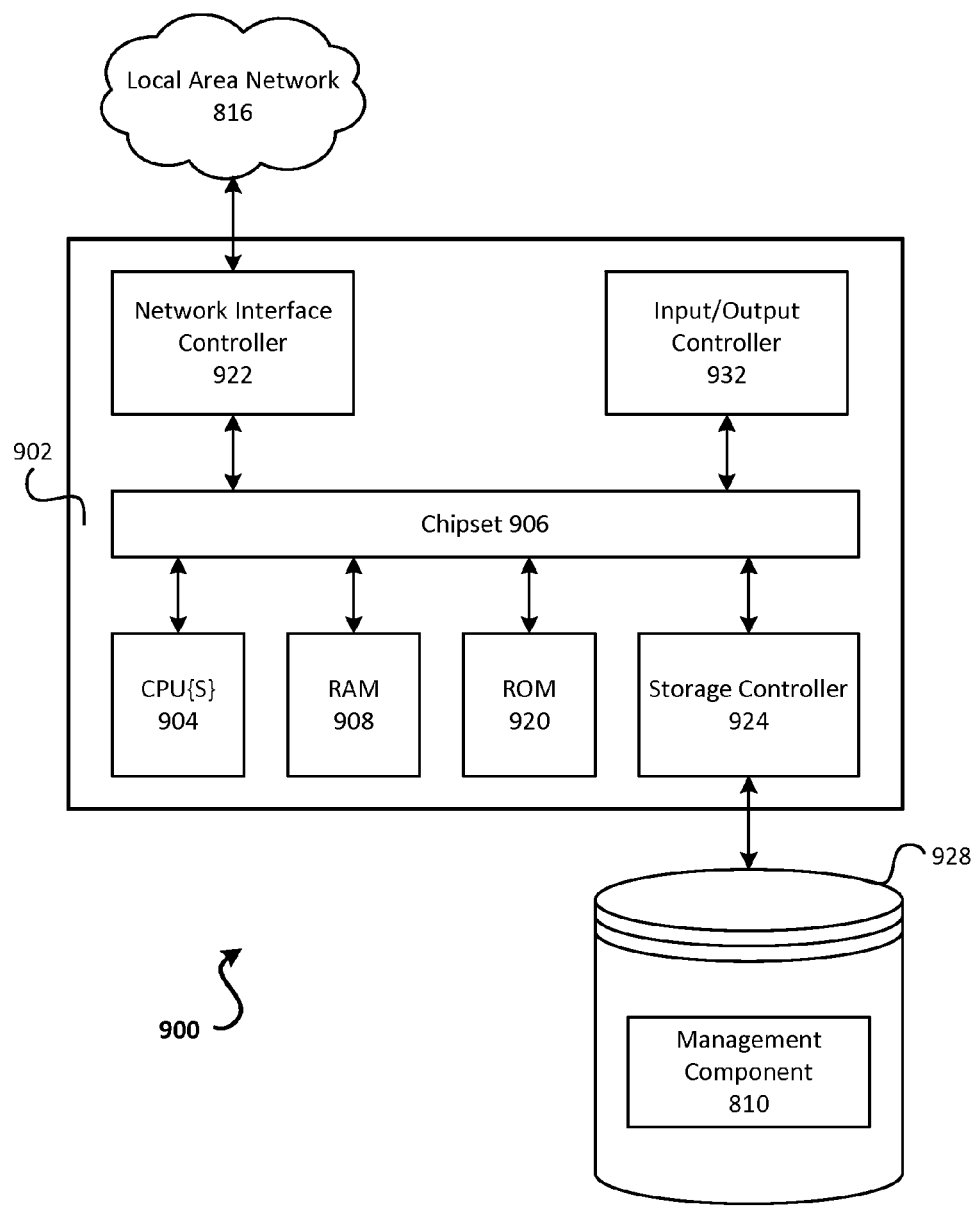
FIG. 9 depicts an example computer architecture for a computer 800 capable of executing the above-described software components.

FIGS. 8-9 are similar to FIG. 1 in that they depict example operating environments in which embodiments disclosed herein may be implemented, and these figures depict these operating environments at varying levels of granularity. FIG. 7 generally depicts a programmable execution service platform that comprises a plurality of datacenters. FIG. 8 generally depicts a datacenter that comprises a plurality of computers. FIG. 9 generally depicts a computer.

It may be appreciated that these operating environments of FIGS. 7-9 may be used to implement aspects of the operating environment of FIG. 1. For example, physical host A 106A, physical host B 106B, mapping server 110 and internal networking infrastructure 108 may be implemented in a datacenter 702 of FIG. 7, or across multiple datacenters 702 of FIG. 7. Likewise, Internet 114 of FIG. 1 may be wide area network of FIG. 7, and customer home network 116 may be customer computing system 704 of FIG. 7.

Within a datacenter 702 of FIG. 7, physical host A 106A and physical host B 106B may each be a server computer 802 of FIG. 8 (which itself may be computer 900 of FIG. 9), host partition X 104A and host partition Y 104B may each be an instance of instance manager 208 (where a host partition serves a hypervisor-type role), and instance A and instance B may each be an instance 806 of FIG. 8. Internal networking infrastructure 108 of FIG. 1 may be local area network 816 of FIG. 8, and mapping server 110 of FIG. 1 may be server computer 804 of FIG. 8.

Turning now to details of FIG. 7, FIG. 7 depicts an example of a suitable computing environment in which embodiments described herein may be implemented. A cloud service provider (such as compute service platform 708) may configure the illustrated computing environment to host virtual clouds of entities and to enable communication paths between these virtual clouds that may otherwise be isolated. In particular, FIG. 7 is a system and network diagram that shows an illustrative operating environment 700 that includes a compute service platform 708, compute service, for implementing virtual clouds and for providing on-demand access to compute resources, such as virtual machine instances. Compute service platform 708 can provide compute resources for executing applications on a permanent or an as-needed basis and may be configured as a private network. These compute resources may include various types of resources, such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as Web servers and/or one large processing resource as a database server, for example.

The compute resources provided by compute service platform 708 may be enabled by one or more datacenters 702A-802N, which may be referred herein singularly as "datacenter 702" or in the plural as "datacenters 702." Datacenters 702 may be facilities that house and operate computer systems and associated components and may include redundant and backup power, communications, cooling and security systems. Datacenters 702 may be located in a same geographical area, such as in a same facility, and may be interconnected using private networks, such as high-speed fiber optic networks, controlled and managed by a service provider of compute service platform 708. Datacenters 702 may also be distributed across geographically disparate locations and may be interconnected in part using public networks, such as the Internet. One illustrative configuration for datacenter 702 that implements the concepts and technologies disclosed herein is described below with regard to FIG. 8.

Entities of compute service platform 708 may access the compute resources provided by datacenters 702 over a wide-area network ("WAN") 706. Although a WAN is illustrated in FIG. 7, it should be appreciated that a local-area network ("LAN"), the Internet or any other networking topology known in the art that connects datacenters 702 to remote entities and other users may be utilized. It should also be appreciated that combinations of such networks may also be utilized.

An entity or other entities that are customers of compute service platform 708 may utilize a computing system 704 to access the compute resources provided by datacenters 702. Customer computing system 704 comprise a computer capable of accessing compute service platform 708, such as a server computer, a desktop or laptop personal computer, a tablet computer, a wireless telephone, a PDA, an e-reader, a game console, a set-top box or any other computing device.

As is described in greater detail below, customer computing system 704 may be utilized to configure aspects of the compute resources provided by compute service platform 708. In this regard, compute service platform 708 may provide a Web interface through which aspects of its operation may be configured through the use of a Web browser application program executing on customer computing system 704. Alternatively, a stand-alone application program executing on customer computing system 704 may access an application programming interface ("API") exposed by compute service platform 708 for performing the configuration operations. Other mechanisms for configuring the operation of compute service platform 708, including launching new virtual machine instances on compute service platform 708, may also be utilized.

According to embodiments disclosed herein, capacities of purchased compute resources provided by compute service platform 708 can be scaled in response to demand. In this regard, scaling refers to the process of instantiating, which may also be referred to herein as "launching" or "creating," or terminating, which may also be referred to herein as "de-scaling," instances of compute resources in response to demand.

Auto scaling may be one mechanism for scaling compute resources in response to increases or lulls in demand for the resources. Auto scaling may allow entities of compute service platform 708 to scale their purchased compute resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in compute service platform 708.

compute service platform 708 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

FIG. 8 depicts a computing system diagram that illustrates one configuration for datacenter 702 that implements compute service platform 708. The example datacenter 702 shown in FIG. 8 may include several server computers 802A-

802N, which may be referred herein singularly as "server computer 802" or in the plural as "server computers 802," for providing compute resources for hosting virtual clouds and for executing applications. Server computers 802 may be standard tower or rack-mount server computers configured appropriately for providing the compute resources described above. For instance, in one implementation server computers 802 may be configured to provide instances 806A-806N of compute resources.

Instances 806A-806N, which may be referred herein singularly as "instance 806" or in the plural as "instances 806," may be virtual machine instances. As known in the art, a virtual machine instance is an instance of a software implementation of a machine (i.e., a computer) that executes programs like a physical machine. In the example of virtual machine instances, each server 802 may be configured to execute an instance manager 808 capable of executing the instances. Instance manager 808 may be a hypervisor or another type of program configured to enable the execution of multiple instances 806 on a single server 802, for example. As discussed above, each of instances 806 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 702 shown in FIG. 8 may also include a server computer 804 reserved for executing software components for managing the operation of datacenter 702, server computers 802 and instances 806. In particular, server computer 804 may execute a management component 810. As discussed above, an entity of compute service platform 708 may utilize customer computing system 704 to access management component 810 to configure various aspects of the operation of compute service platform 708 and instances 806 purchased by the entity. For example, the entity may purchase instances and make changes to the configuration of the instances. The entity may also specify settings regarding how the purchased instances are to be scaled in response to demand. The entity may also provide requests to launch instances to management component 810.

As also described briefly above, an auto scaling component 812 may scale instances 806 based upon rules defined by an entity of compute service platform 708. For example, auto scaling component 812 may allow an entity to specify scale up rules for use in determining when new instances should be instantiated and scale down rules for use in determining when existing instances should be terminated.

Auto scaling component 812 may execute on a single server computer 804 or in parallel across multiple server computers 802 in compute service platform 708. In addition, auto scaling component 812 may consist of a number of subcomponents executing on different server computers 802 or other computing devices in compute service platform 708. Auto scaling component 812 may be implemented as software, hardware or any combination of the two. Auto scaling component 812 may monitor available compute resources in compute service platform 708 over an internal management network, for example.

As discussed briefly above, datacenter 702 may also be configured with a deployment component 814 to assist entities in the deployment of new instances 806 of compute resources. Deployment component 814 may receive a configuration from an entity that includes data describing how new instances 806 should be configured. For example, the configuration may specify one or more applications that should be installed in new instances 806, provide scripts and/or other types of code to be executed for configuring new instances 806, provide cache warming logic specifying how an application cache should be prepared and other types of information.

Deployment component 814 may utilize the entity-provided configuration and cache warming logic to configure, prime and launch new instances 806. The configuration, cache warming logic and other information may be specified by an entity using management component 810 or by providing this information directly to deployment component 814. Other mechanisms may also be utilized to configure the operation of deployment component 814.

In the example datacenter 702 shown in FIG. 8, an appropriate LAN 816 may be utilized to interconnect server computers 802A-802N and server computer 804. LAN 816 may also be connected to WAN 706 illustrated in FIG. 7. It should be appreciated that the network topology illustrated in FIGS. 7 and 8 has been greatly simplified and that many more networks and networking devices may be utilized to interconnect the various computing systems disclosed herein. Appropriate load balancing devices or software modules may also be utilized for balancing a load between each of datacenters 702A-702N, between each of server computers 802A-802N in each datacenter 702 and between instances 806 purchased by each entity of compute service platform 708. These network topologies and devices should be apparent to those skilled in the art.

It should be appreciated that datacenter 702 described in FIG. 8 is merely illustrative and that other implementations may be utilized. In particular, functionality described herein as being performed by management component 810, auto scaling component 812 and deployment component 814 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 9 depicts an example computer architecture for a computer 900 capable of executing the above-described software components. The computer architecture shown in FIG. 9 illustrates a conventional server computer, workstation, desktop computer, laptop, tablet, network appliance, PDA, e-reader, digital cellular phone or other computing device, and may be utilized to execute any aspects of the software components presented herein described as executing within datacenters 702A-702N, on server computers 802A-802N, on the customer computing system 704 or on any other computing system mentioned herein.

Computer 900 may include a baseboard, or "motherboard," which is a printed circuit board to which a multitude of components or devices may be connected by way of a system bus or other electrical communication paths. One or more central processing units ("CPUs") 904 may operate in conjunction with a chipset 906. CPUs 904 may be standard programmable processors that perform arithmetic and logical operations necessary for the operation of computer 900.

CPUs 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 906 may provide an interface between CPUs 904 and the remainder of the components and devices on the baseboard. Chipset 906 may provide an interface to a random access memory ("RAM") 908 used as the main memory in computer 900. Chipset 906 may further provide an interface to a computer-readable storage medium such as a read-only memory ("ROM") 920 or non-volatile RAM ("NVRAM") for storing basic routines that may help to start up computer 900 and to transfer information between the various components and devices. ROM 920 or NVRAM may also store other software components necessary for the operation of computer 900 in accordance with the embodiments described herein.

Computer 900 may operate in a networked environment using logical connections to remote computing devices and computer systems through network 816. Chipset 906 may include functionality for providing network connectivity through a network interface controller ("NIC") 922, such as a gigabit Ethernet adapter. NIC 922 may be capable of connecting the computer 900 to other computing devices over network 816. It should be appreciated that multiple NICs 922 may be present in computer 900, connecting the computer to other types of networks and remote computer systems.

Computer 900 may be connected to a mass storage device 928 that provides non-volatile storage for the computer. Mass storage device 928 may store system programs, application programs, other program modules and data which have been described in greater detail herein. Mass storage device 928 may be connected to computer 900 through a storage controller 924 connected to chipset 906. Mass storage device 928 may consist of one or more physical storage units. Storage controller 924 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 900 may store data on mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units, whether mass storage device 928 is characterized as primary or secondary storage and the like.

For example, computer 900 may store information to mass storage device 928 by issuing instructions through storage controller 924 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 900 may further read information from mass storage device 928 by detecting the physical states or characteristics of one or more particular locations within the physical storage units.

In addition to mass storage device 928 described above, computer 900 may have access to other computer-readable storage media to store and retrieve information, such as program modules, data structures or other data. It should be appreciated by those skilled in the art that computer-readable storage media can be any available media that provides for the storage of non-transitory data and that may be accessed by computer 900.

By way of example and not limitation, computer-readable storage media may include volatile and non-volatile, transitory and non-transitory, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices or any other medium that can be used to store the desired information in a non-transitory fashion.

Mass storage device 928 may store an operating system utilized to control the operation of the computer 900. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 928 may store other system or application programs and data utilized by computer 900, such as management component 810 and/or the other software components described above.

Mass storage device 928 or other computer-readable storage media may also be encoded with computer-executable instructions, which, when loaded into computer 900, transforms the computer from a general-purpose computing system into a special-purpose computer capable of implementing the embodiments described herein. These computer-executable instructions transform computer 900 by specifying how CPUs 904 transition between states, as described above. Computer 900 may have access to computer-readable storage media storing computer-executable instructions, which, when executed by computer 900, may perform operating procedures depicted in FIGS. 3-6.

Computer 900 may also include an input/output controller 932 for receiving and processing input from a number of input devices, such as a keyboard, a mouse, a touchpad, a touch screen, an electronic stylus or other type of input device. Similarly, input/output controller 932 may provide output to a display, such as a computer monitor, a flat-panel display, a digital projector, a printer, a plotter or other type of output device. It will be appreciated that computer 900 may not include all of the components shown in FIG. 9, may include other components that are not explicitly shown in FIG. 9 or may utilize an architecture completely different than that shown in FIG. 9.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for communicating between a plurality of computing nodes, the computing nodes configured to communicate over a physical network, comprising:
   receiving from a first computing node of the plurality of computing nodes a first indicator of at least one virtual networking protocol that the first computing node is configured to use;
   receiving from a second computing node of the plurality of computing nodes a second indicator of at least one virtual networking protocol that the second computing node is configured to use; and
   sending a third indicator to the first computing node, the third indicator indicative of a virtual networking protocol selected from a plurality of virtual networking protocols based on the first indicator and the second indicator, wherein the first computing node sends a network packet over the physical network to the second computing node, the network packet bearing information formatted according to the virtual networking protocol selected from the plurality of virtual networking protocols.

2. The method of claim 1, further comprising:
receiving an indication to instantiate a virtual machine (VM) instance on the plurality of computing nodes, and an indication of a virtual networking protocol to be used by a computing node that hosts the VM instance;
selecting a third computing node of the plurality of computing nodes on which to place the VM instance based at least in part on the third computing node being configured to use the virtual networking protocol to be used by the computing node that hosts the VM instance; and
instantiating the VM instance on the third computing node.

3. The method of claim 2, further comprising:
sending at least one computing node of the plurality of computing nodes that is separate from the third computing node an indication to use the virtual networking protocol to be used by the computing node that hosts the VM instance when sending communications to the VM instance.

4. The method of claim 2, wherein the indication of the virtual networking protocol to be used by the computing node that hosts the VM instance comprises at least one required protocol capability and at least one desired protocol capability, and wherein selecting the third computing node comprises:
selecting the computing node on which to place the VM instance in response to determining that the third computing node is configured to use the at least one required protocol capability, the third computing node has sufficient load to execute the VM instance, a policy indicates that it is acceptable to execute the VM instance on the third computing node, and no computing node of the plurality of computing node is configured to use the at least one desired protocol capability.

5. A system, comprising:
a plurality of computing nodes; and
a memory bearing instructions that, upon execution by a processor, cause a computing node of the plurality of computing nodes at least to:
receive an indication of at least one communication capability among a plurality of communication capabilities of a source computing node of the plurality of computing nodes;
receive an indication of at least one communication capability among a plurality of communication capabilities of a destination computing node of the plurality of computing nodes;
select a selected communication capability based on the indication of at least one communication capability among a plurality of communication capabilities of the source computing node and the indication of at least one communication capability among a plurality of communication capabilities of the destination computing node; and
send an indication to the source computing node to use the selected communication capability in communicating with the destination computing node,
wherein the source computing node sends a network packet over a first network to the destination computing node, the network packet bearing information formatted according to the selected communication capability.

6. The system of claim 5, wherein the memory further bears instructions that, upon execution by the processor, cause the system at least to:
receive, by the source computing node a mapping between a network address on a second network used by the destination computing node and a network address on the first network used by the destination computing node to identify the destination computing node; and
wherein the instructions that, upon execution by the processor, cause the system at least to modify the network packet according to the selected communication capability further cause the system at least to modify the network packet so that the modified network packet identifies a destination of the modified network packet as the network address on the first network, where the network packet identifies a destination of the network packet as the network address on the second network.

7. The system of claim 5, wherein there are a first communication capability and a second communication capability, the second communication capability offering functionality not offered by the first communication capability, and wherein the instructions that, upon execution by the processor, cause the system to select the selected communication capability further cause the system at least to:
select the second communication capability as the selected communication capability in response to determining that the source computing node and the destination computing node each have the first communication capability and the second communication capability.

8. The system of claim 5, wherein there are a first communication capability and a second communication capability, the second communication capability offering functionality not offered by the first communication capability, and wherein the instructions that, upon execution by the processor, cause the system to select the selected communication capability further cause the system at least to:
select the first communication capability as the selected communication capability in response to determining that the source computing node and the destination computing node each have the first communication capability, the source computing node has the second communication capability, and the destination computing node lacks the second communication capability.

9. The system of claim 5, wherein there are a first communication capability and a second communication capability, the second communication capability offering functionality not offered by the first communication capability, and wherein the instructions that, upon execution by the processor, cause the system to select the selected communication capability further cause the system at least to:
select the first communication capability as the selected communication capability in response to determining that the source computing node and the destination computing node each have the first communication capability, the source computing node lacks the second communication capability, and the destination computing node has the second communication capability.

10. The system of claim 5, wherein there are a first communication capability and a second communication capability, the second communication capability offering functionality not offered by the first communication capability, and wherein the instructions that, upon execution by the processor, cause the system to select the selected communication capability further cause the system at least to:
select the first communication capability as the selected communication capability in response to determining that the source computing node and the destination computing node each have the first communication capability and the second communication capability.

11. The system of claim 10, wherein the instructions that, upon execution by the processor, cause the system to select the selected communication capability further cause the system at least to:
select the first communication capability as the selected communication capability in response to determining that a policy indicates not to use the second communication capability in communications between the source computing node and the destination computing node.

12. The system of claim 5, wherein the selected communication capability comprises an indication to use encryption, an indication not to use encryption, a format to use when encoding packets, a size of a field for packets, and order of fields for packets, an integrity check, an indication to use compression, an indication not to use compression, or an indication of a configuration for flow control.

13. The system of claim 5, wherein the instructions that, upon execution by the processor, cause the system at least to receive the indication of communication capabilities of the source computing node further cause the system at least to:
receive the indication of communication capabilities of the source computing node from a computing node different from the source computing node; and
wherein the instructions that, upon execution by the processor, cause the system at least to receive the indication of communication capabilities of the destination computing node further cause the system at least to receive the indication of the communication capabilities of the source computing node from a computing node different from the destination computing node.

14. The system of claim 5, wherein the plurality of computing nodes are part of a compute service platform that provides compute resources to a plurality of customers.

15. The system of claim 5, wherein the instructions that, upon execution by the processor, cause the system at least to select the selected communication capability further cause the system at least to:
select the selected communication capability based on the indication of at least one communication capability among a plurality of communication capabilities of the source computing node, the indication of at least one communication capability among a plurality of communication capabilities of the destination computing node, and a policy that governs communications between the source computing node and the destination computing node.

16. The system of claim 15, wherein the policy is determined in response to input from an administrator or a customer.

17. The system of claim 5, wherein the instructions that, upon execution by the processor, cause the system at least to send the indication to the source computing node to use the selected communication capability in communicating with the destination computing node, wherein the source computing node sends a network packet over a first network to the destination computing node, the network packet bearing information formatted according to the selected communication capability further cause the system at least to:
send the indication to the source computing node to use the selected communication capability in communicating with the destination computing node,
wherein the source computing node sends a network packet over a first network to the destination computing node, the network packet bearing information formatted according to the selected communication capability, and
wherein the destination computing node receives the network packet over the first network from the source computing node, parses the network packet according to the selected communication capability, and drops the network packet where the network packet lacks the selected communication capability.

18. A non-transitory computer-readable storage medium bearing computer-executable instructions that, when executed on a computing node, cause the computing node to perform operations comprising:
receiving an indication of communication capabilities of a source computing node of a plurality of computing nodes;
receiving an indication of communication capabilities of a destination computing node of the plurality of computing nodes;
selecting a selected communication capability based on a received indication of communication capabilities of the source computing node and the indication of communication capabilities of the destination computing node; and
sending an indication to the source computing node to use the selected communication capability in communicating with the destination computing node,
wherein the source computing node sends a network packet over a first network to the destination computing node, the network packet bearing information formatted according to the selected communication capability.

19. The computer-readable storage medium of claim 18, further bearing computer-executable instructions that, when executed on the computing node, cause the computing node to perform operations comprising:
receiving, by the source computing node a mapping between a network address on a second network used by the destination computing node and a network address on the first network used by the destination computing node to identify the destination computing node; and
wherein modifying the network packet according to the selected communication capability comprises modifying the network packet so that the modified network packet identifies a destination of the modified network packet as the network address on the first network, where the network packet identifies a destination of the network packet as the network address on the second network.

20. The computer-readable storage medium of claim 18, wherein there are a first communication capability and a second communication capability, the second communication capability offering functionality not offered by the first communication capability and further bearing computer-executable instructions that, when executed on the computing node, cause the computing node to perform operations comprising:
selecting the second communication capability as the selected communication capability in response to determining that the source computing node and the destination computing node each have the first communication capability and the second communication capability.

21. The computer-readable storage medium of claim 18, wherein there are a first communication capability and a second communication capability, the second communication capability offering functionality not offered by the first communication capability, and further bearing computer-executable instructions that, when executed on the computing node, cause the computing node to perform operations comprising:

selecting the first communication capability as the selected communication capability in response to determining that the source computing node and the destination computing node each have the first communication capability, the source computing node has the second communication capability, and the destination computing node lacks the second communication capability.

22. The computer-readable storage medium of claim 18, wherein there are a first communication capability and a second communication capability, the second communication capability offering functionality not offered by the first communication capability, and further bearing computer-executable instructions that, when executed on the computing node, cause the computing node to perform operations comprising:
  selecting the first communication capability as the selected communication capability in response to determining that the source computing node and the destination computing node each have the first communication capability, the source computing node lacks the second communication capability, and the destination computing node has the second communication capability.

23. The computer-readable storage medium of claim 18, further bearing computer-executable instructions that, when executed on the computing node, cause the computing node to perform operations comprising:
  receiving an indication to instantiate a third VM instance on the plurality of computing nodes, and an indication of a communication capability of the third VM instance;
  selecting a third computing node of the plurality of computing nodes on which to place the third VM instance based at least in part on the third computing node having the communication capability of the third VM instance; and
  instantiating the third VM instance on the third computing node.

24. The computer-readable storage medium of claim 23, further bearing computer-executable instructions that, when executed on the computing node, cause the computing node to perform operations comprising:
  sending at least one computing node of the plurality of computing nodes that is separate from the third computing node an indication to use encryption when sending communications to the third VM instance.

25. The computer-readable storage medium of claim 23, wherein the indication of a communication capability of the third VM instance comprises at least one required communication capability and at least one desired communication capability, and wherein selecting the third computing node of the plurality of computing nodes based at least in part on the third computing node having the communication capability of the third VM instance comprises:
  selecting the third computing node of the plurality of computing nodes on which to place the third VM instance in response to determining that the third computing node has the required communication and no computing node of the plurality of computing nodes has the desired communication capability.

26. The computer-readable storage medium of claim 23, wherein the indication of a communication capability of the third VM instance comprises at least one required communication capability and at least one desired communication capability, and wherein selecting the third computing node of the plurality of computing nodes based at least in part on the third computing node having the communication capability of the third VM instance comprises:
  selecting the third computing node of the plurality of computing nodes on which to place the third VM instance in response to determining that the third computing node has the required communication and no computing node of the plurality of computing nodes has the required communication capability and the desired communication capability, and capacity to host the third VM instance.

27. The computer-readable storage medium of claim 18, further bearing computer-executable instructions that, when executed on the computing node, cause the computing node to perform operations comprising:
  receiving an indication of user input indicative of the selected communication capability.

28. The computer-readable storage medium of claim 18, wherein selecting the selected communication capability comprises:
  selecting the selected communication capability based on the indication of communication capabilities of the source computing node, the indication of communication capabilities of the destination computing node, and a policy that governs communications between the source computing node and the destination computing node.

29. The computer-readable storage medium of claim 18, wherein sending the indication to the source computing node to use the selected communication capability in communicating with the destination computing node, wherein the source computing node sends a network packet over a first network to the destination computing node, the network packet bearing information formatted according to the selected communication capability further comprises:
  sending the indication to the source computing node to use the selected communication capability in communicating with the destination computing node,
  wherein the source computing node sends a network packet over a first network to the destination computing node, the network packet bearing information formatted according to the selected communication capability, and
  wherein the destination computing node receives the network packet over the first network from the source computing node, and parses the network packet according to the selected communication capability.

\* \* \* \* \*